United States Patent
Beaumont et al.

(10) Patent No.: US 7,093,267 B2
(45) Date of Patent: *Aug. 15, 2006

(54) HOSTING CONTROLS IN A WINDOW VIA AN INTERFACE FOR CONTROLLING THE WINDOW

(75) Inventors: Christian Beaumont, Issaquah, WA (US); James F. Springfield, Woodinville, WA (US); Nenad Stefanovic, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 733 days.

This patent is subject to a terminal disclaimer.

(21) Appl. No.: 10/198,861

(22) Filed: Jul. 19, 2002

(65) Prior Publication Data

US 2002/0191022 A1    Dec. 19, 2002

Related U.S. Application Data

(63) Continuation of application No. 09/082,234, filed on May 20, 1998, now Pat. No. 6,473,100.

(51) Int. Cl.
  G06F 3/00    (2006.01)
  G06F 9/44    (2006.01)
  G06F 9/46    (2006.01)
  G06F 13/00   (2006.01)

(52) U.S. Cl. .................................. 719/328; 719/331
(58) Field of Classification Search ................ 719/328, 719/331–332, 319, 310; 715/781, 744, 803, 715/804

See application file for complete search history.

(56) References Cited

U.S. PATENT DOCUMENTS

| 5,204,947 A | 4/1993 | Bernstein et al. ........... 345/357 |
| 5,455,904 A * | 10/1995 | Bouchet et al. ............. 715/798 |
| 5,500,929 A | 3/1996 | Dickinson .................... 345/356 |
| 5,682,510 A | 10/1997 | Zimmerman ................ 345/352 |
| 5,704,050 A | 12/1997 | Redpath ....................... 345/339 |
| 5,754,175 A | 5/1998 | Koppolu et al. ............ 345/340 |
| 5,761,656 A | 6/1998 | Ben-Shachar ............... 345/335 |

(Continued)

OTHER PUBLICATIONS

Hosting ActiveX Controls Using ATL AXHost, http://search.microsoft.com/search/results.aspx?qu=control+hosting&View=msdn&st=b&c=0&s=1&swc=0, undated.*

(Continued)

Primary Examiner—William Thomson
Assistant Examiner—Diem Cao
(74) Attorney, Agent, or Firm—Woodcock Washburn LLP

(57) ABSTRACT

Hosting user interface controls in a window via an interface for controlling the window is disclosed. One aspect of the invention is a computerized system having an operating system and at least one program. The operating system provides for hosting controls of a predetermined type within windows of a predetermined type via an interface for controlling the windows. The programs utilize the interface to host one or more controls within one or more windows. Thus, with respect to versions of the MICROSOFT WINDOWS operating system, a program may utilize the WIN32 API (i.e., interface) to host ACTIVEX-type controls within windows hosted by the program, also via the WIN32 API.

7 Claims, 3 Drawing Sheets

U.S. PATENT DOCUMENTS

| | | | |
|---|---|---|---|
| 5,764,916 A | 6/1998 | Busey et al. | 709/227 |
| 5,802,530 A | 9/1998 | Van Hoff | 707/513 |
| 5,831,609 A | 11/1998 | London et al. | 345/335 |
| 5,845,299 A | 12/1998 | Arora et al. | 707/513 |
| 5,862,377 A | 1/1999 | Lee et al. | 395/326 |
| 5,886,694 A | 3/1999 | Breinberg et al. | 345/340 |
| 5,889,522 A | 3/1999 | Chew et al. | 345/155 |
| 5,990,889 A | 11/1999 | Amro | 345/342 |
| 6,002,395 A | 12/1999 | Wagner et al. | 345/333 |
| 6,008,805 A | 12/1999 | Land et al. | 345/335 |
| 6,065,012 A | 5/2000 | Balsara et al. | 707/102 |
| 6,144,377 A | 11/2000 | Oppermann et al. | 345/744 |
| 6,229,537 B1 * | 5/2001 | Sobeski et al. | 715/803 |
| 6,243,764 B1 | 6/2001 | Leach et al. | 709/396 |
| 6,263,352 B1 | 7/2001 | Cohen | 707/513 |
| 6,275,833 B1 | 8/2001 | Nakamura et al. | 707/513 |
| 6,334,157 B1 | 12/2001 | Oppermann et al. | 709/310 |
| 6,473,100 B1 * | 10/2002 | Beaumont et al. | 715/781 |
| 6,611,878 B1 * | 8/2003 | De Armas et al. | 719/328 |
| 6,874,148 B1 * | 3/2005 | Richardson et al. | 719/328 |

OTHER PUBLICATIONS

Reiter, H. et al.; "Interaction between Java and Lon Works," *IEEE*, 1997, pp. 335-340.

* cited by examiner

HOSTING CONTROLS IN A WINDOW VIA AN INTERFACE FOR CONTROLLING THE WINDOW

CROSS-REFERENCE TO RELATED APPLICATIONS

This application is a continuation of U.S. patent application Ser. No. 09/082,234, filed May 20, 1998 now U.S. Pat. No. 6,473,100, entitled "Hosting Controls in a Window via an Interface for Controlling the Window."

FIELD OF THE INVENTION

This invention relates generally to user interface controls, and more particularly to hosting such controls in a window via an interface for controlling the window.

BACKGROUND OF THE INVENTION

Graphical user interfaces have become standard fare on most computers sold today. For example, versions of the MICROSOFT WINDOWS operating system provide a graphical user interface in which a pointer is positionable over windows on a screen via an input device such as a mouse or a trackball. Clicking a button on the input device when the pointer is positioned over a given feature of the window, such as a control, registers with the program hosting the window, such that the program performs a given functionality associated with the control. For example, moving the pointer over a "save" button in a window hosted by a word processing program, and clicking a button on the application programs in the MICROSOFT WINDOWS operating system. ACTIVEX controls are known within the art, and are described in Adam Denning, *ActiveX Controls Inside Out* (ISBN 1-57231-350-1) (1997), and David Chappell, *Understanding ActiveX and OLE* (ISBN 1-57231-216-5) (1996), both of which are hereby incorporated by reference. For example, in the Chappell book, on page 205, is states that qualifying as an ActiveX control (OLE Controls technology was renamed ActiveX Controls) requires only support for the IUnknown interface and the ability to self-register with the system registry. Using ACTIVEX controls that have already been created means that computer programmers do not have to "reinvent the wheel"—that is, they do not have to create controls that have been already created by others.

However, for many programmers normally accustomed to only the WIN32 API, using ACTIVEX controls in MICROSOFT WINDOWS operating system-intended programs is not straightforward. A programmer may, for example, have to write original "container code," so that the ACTIVEX control may be hosted within a window via the container code. Again, many programmers may not be experienced in creation of such container code. Furthermore, hosting ACTIVEX controls within application program windows may require the programmer to have experience in Component Object Model (COM) objects, which the programmer may not have. COM is known within the art, and is described in Dale Rogerson, *Inside COM* (ISBN 1-57231-349-8) (1997), which is hereby incorporated by reference. Thus, even if having access to a large number of ACTIVEX controls, a programmer may still not be able to easily include them in a given computer program under development.

A limited solution to this problem is provided by the Microsoft Foundation Classes (MFC). ACTIVEX controls may be accessible through MFC for programmers who use the computer language C++ to develop computer programs. a significant disadvantage is presented to those programmers who do not utilize C++ to develop programs. That is, because MFC is typically not accessible except through C++, a computer programmer without such knowledge may find himself or herself still unable to utilize existing ACTIVEX user interface controls within computer programs the Again, however, programmer may be developing.

There is a need, therefore, for permitting computer programmers to include ACTIVEX controls in their programs in an easy-to-understand and straightforward fashion. That is, there is a need for permitting computer programmers to include ACTIVEX controls in their programs without having to resort to COM, or MFC (via C++). Ideally, a programmer should be able to include ACTIVEX controls in a computer program using precepts and constructs already familiar to him or her.

SUMMARY OF THE INVENTION

The above-mentioned shortcomings, disadvantages and problems are addressed by the present invention, which will be understood by reading and studying the following specification. One aspect of the invention is a computerized system having an operating system and at least one program. The operating system provides for hosting controls of a predetermined type within windows of a predetermined type via an interface for controlling the windows. The programs then utilize the interface to host one or more controls within one or more windows. In the context of versions of the MICROSOFT WINDOWS operating system, this means that the program may utilize the WIN32 API (i.e., interface) to host ACTIVEX-type controls within windows hosted by the program, also via the WIN32 API.

In other words, computer programmers who are already accustomed to utilizing the WIN32 API to host windows by their computer programs are now able to have these windows host ACTIVEX controls via the same type of commands used in utilizing the WIN32 API. Such programmers do not have to learn any fundamentally new constructs or precepts to host ACTIVEX controls under the invention. They are not required to use MFC via C++, nor use COM, nor develop their own container code for the controls.

The present invention includes computerized systems, methods, computers, operating systems, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, an overview of the invention is presented. In the third section, computerized methods in accordance with an embodiment of the invention is provided. Finally, in the fourth section, a conclusion of the detailed description is provided.

Hardware and Operating Environment

Figure 1:
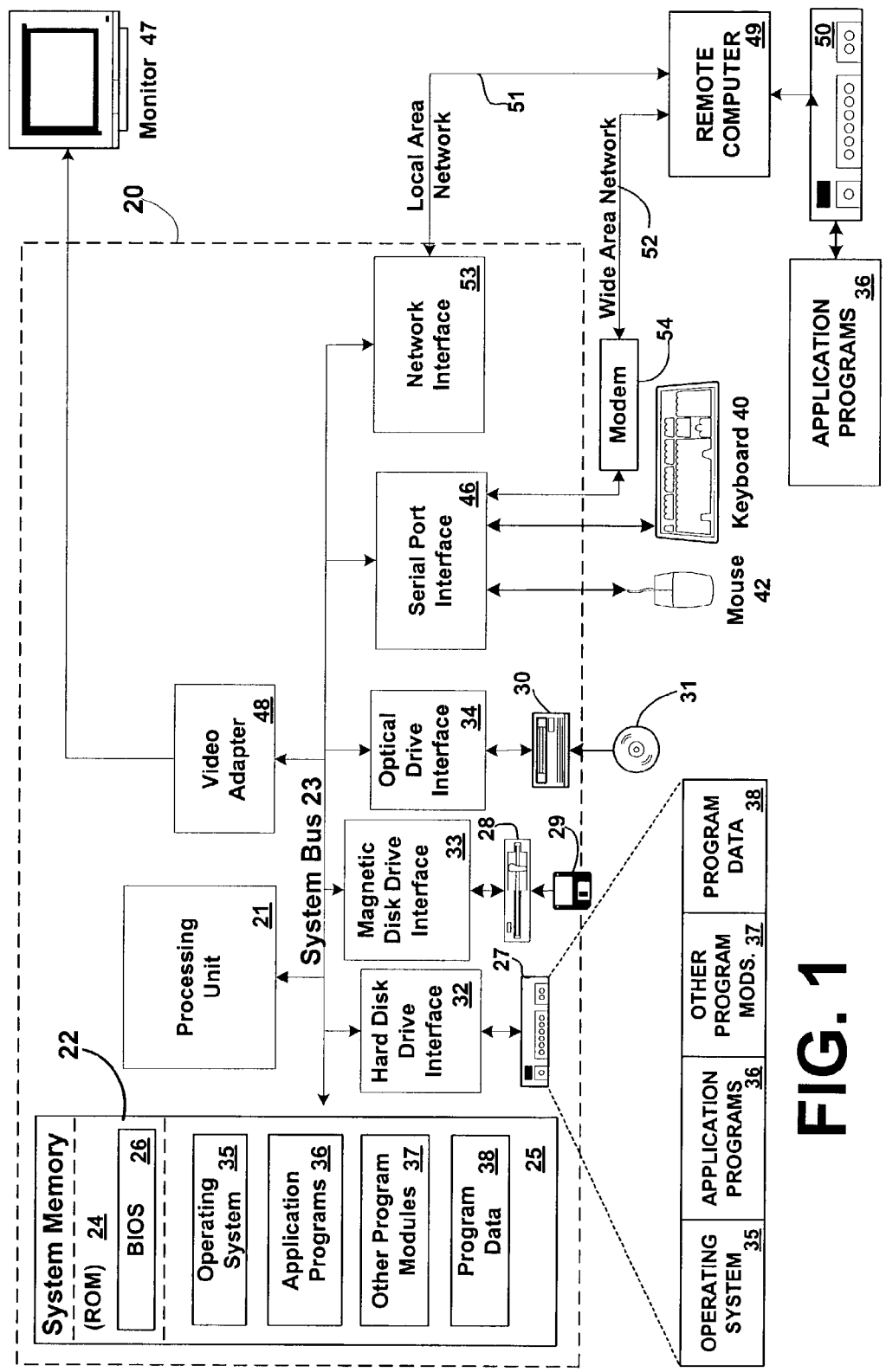
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory 22 to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

Overview of the Invention

Figure 2A:
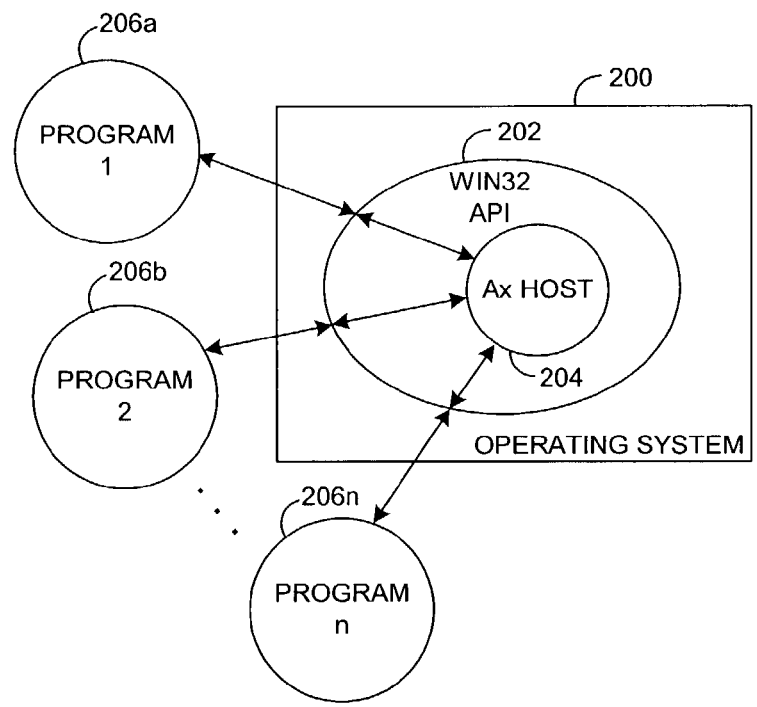
FIG. 2(a) shows a diagram of a computerized system according to one embodiment of the invention.
Figure 2B:
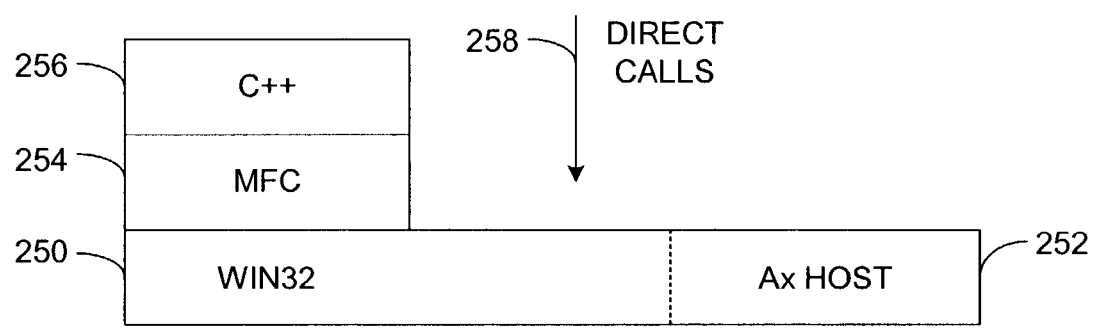
FIG. 2(b) shows a diagram illustrating the relationship between the invention as an embodiment thereof is implemented within the WIN32 API, and MFC and C++.

An overview of an exemplary embodiment of the invention is described by reference to FIGS. 2(a)–2(b). FIG. 2(a) shows a diagram of a computerized system according to one embodiment of the invention. FIG. 2(b) shows a diagram illustrating the relationship between an embodiment 20 of the invention as implemented within the WIN32 API, and Specifically, MFC and C++.

Referring first to FIG. 2(a), a computerized system is shown that includes operating system 200, WIN32 API 202, AxHost program 204, and computer programs 206a, 206b, . . . , 206n. Operating system 200 is in one embodiment a version of the MICROSOFT WINDOWS operating system, such as MICROSOFT WINDOWS 95, 98, or NT. WIN32 API 202 is a type of interface, that with respect to versions of the MICROSOFT WINDOWS operating system, permits computer programs to host (i.e., control) windows within the graphical user interface provided by the operating system. In one embodiment, the windows are of a predetermined type as dictated by the operating system— e.g., windows of the MICROSOFT WINDOWS operating system. The WIN32 API is known within the art. The WIN32 API is utilized for, among other functionality, to provide for the hosting of windows by application programs running within the MICROSOFT WINDOWS operating system. AxHost program 204 runs in conjunction with and as an extension of WIN32 API 202 (i.e., it is a component thereof), to permit the WIN32 API to also permit application programs running within the MICROSOFT WINDOWS operating system to have ACTIVEX controls hosted within their windows. Computer programs 206a, 206b, . . . , 206n, are any type of programs running within operating system 200. For example, the programs may be application programs such as word processing programs, spreadsheets, Internet world-wide-web browsers, etc.

The computerized system of FIG. 2(a) works as follows. When any of programs 206a, 206b, . . . , 206n needs to host a window within the graphical user interface provided by operating system 200, it calls a function defined within WIN32 API 202. Such function calling is known within the art. WIN32 API 202 returns a handle, or identifier, referencing the window that it created within the graphical user interface provided by operating system 200. WIN32 API 202 also provides for control of windows created thereby. For example, if the controlling application 206a, 206b, . . . , or 206n needs to change the size of a window it has hosted by previously calling WIN32 API 202, it may reference the handle that was returned by the previous call in another function call to WIN32 API 202 that implements this appropriate functionality. Such controlling of windows is also known within the art.

Next, the computer program that is hosting the window by virtue of the call to the WIN32 API makes additional calls to the WIN32 API to host and control an ACTIVEX control; these calls will be handled by the AxHost program. The calls made to the WIN32 API for ActiveX control hosting, as handled by the AxHost program, are desirably in the same general format as are other function calls made to the WIN32 API, as known to those of ordinary skill within the art. Although the invention is not limited to the particular manner of implementation of the AxHost program, one embodiment is described in a later section of the detailed description in conjunction with FIGS. 3(a) and 3(b). In this embodiment, the AxHost program is a part of and an extension of the WIN32 API; it intercepts calls made to the WIN32 API that are specific to the hosting of ACTIVEX controls.

Thus, the invention provides for advantages not found in the prior art. Hosting of ACTIVEX controls is provided for under the same construct and precepts as are hosting of windows of the MICROSOFT WINDOWS operating system, via calls to the WIN32 API. The AxHost program intercepts the calls to provide for hosting of the ACTIVEX controls. Therefore, programmers familiar with the WIN32 API, but who are not familiar with COM, MFC, or C++, can easily incorporate ACTIVEX controls within their programs, without having to write container code for such controls.

Referring next to FIG. 2(b), a diagram illustrating the relationship between the invention as an embodiment thereof as implemented within the WIN32 API, and MFC and C++, is shown. WIN32 API 250 includes as a part and extension thereof AxHost program 252. On top of this layer is MFC 254, the Microsoft Foundation Classes, which conceptually sits on top of WIN32 API 250. That is, the Microsoft Foundation Classes provides a functionality that itself relies upon the functionality of the WIN32 API. The MFC may itself provide ACTIVEX hosting functionality as an additional functionality on top of that provided by the WIN32 API. However, typically the MFC is only accessible via the C++ programming language, as represented by C++ layer 256. Therefore, a programmer who is not versed in MFC or C++ will not be able to host ACTIVEX functionality that may be provided by MFC via C++ programming; this is in contradistinction to the invention. The invention provides for direct calls to the WIN32 API, as represented by arrow 258, for the hosting and control of ACTIVEX controls. This is believed to be a novel innovation in the hosting of ACTIVEX controls.

An overview of the invention has been provided. Those of ordinary skill within the art will appreciate that while the invention has been described in relation to the MICROSOFT WINDOWS operating system, windows of the MICROSOFT WINDOWS operating system, ACTIVEX controls, and the WIN32 API, the invention is not so limited. Thus, an operating system providing for hosting controls of a predetermined type within windows of a predetermined type via an interface for controlling the windows is within the scope of the invention. Within such an operating system, computer programs may utilize the interface to host one or more controls within windows.

Methods According to an Exemplary Embodiment of the Invention

In the previous section, an overview of the operation of an exemplary embodiment of the invention was described. In this section, computerized methods in conjunction with which the system of the previous section may be used is shown. The computerized methods are shown by reference to FIGS. 3(a)–3(b), each of which is a flowchart of a computerized method according to an embodiment of the invention. Each of these methods is desirably realized as a program running on a computer—that is, as a program executed from a computer-readable medium such as a memory by a processor of a computer. In one embodiment, the program provides for an interface, such as an application programming interface (API) like the WIN32 API, that effectuates the computerized methods of FIGS. 3(a)–3(b). In another embodiment, the program is storable on a computer-readable medium such as a floppy disk or a CD-ROM, for distribution and installation on another computer.

Figure 3A:
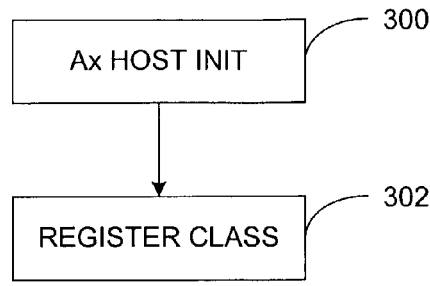
FIG. 3(a) shows a flowchart illustrating an initialization method according to one embodiment of the invention.

Referring first to FIG. 3(a), an initialization method according to an embodiment of the invention is shown. Desirably, the AxHost program as previously described in conjunction with FIGS. 2(a) and 2(b) resides within a dynamic-link library file (DLL) that is executed at start-up of the operating system (i.e., desirably a version of the MICROSOFT WINDOWS operating system). Thus, from step 300 control proceeds to step 302. In step 302, a window class for implementing an ACTIVEX control container is registered with the operating system; registration of classes within the MICROSOFT WINDOWS operating system is known within the art. In one embodiment of the invention, the window class is "AxHost."

Figure 3B:
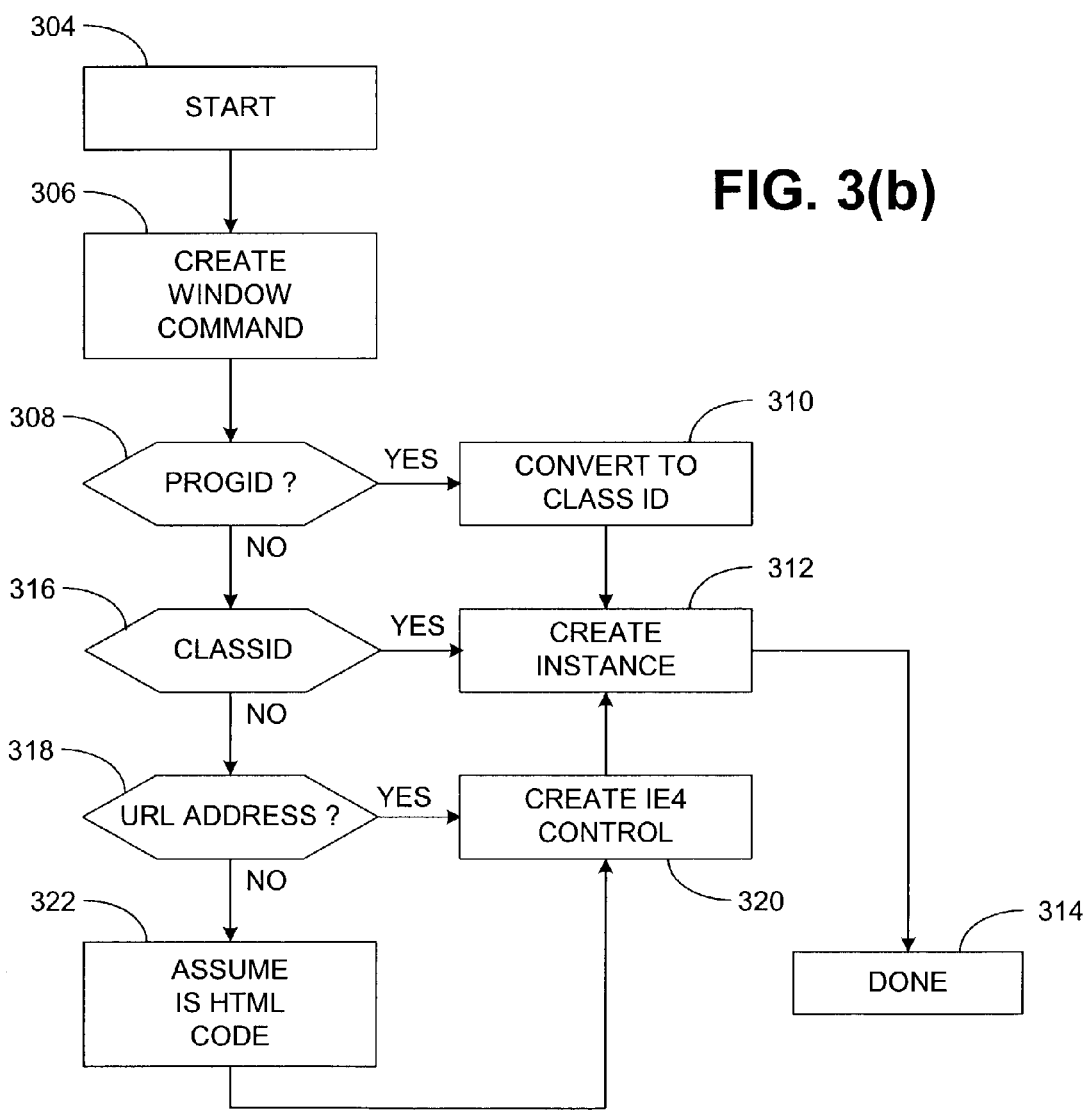
FIG. 3(b) shows a flowchart illustrating a computerized method according to one embodiment of the invention.

Referring next to FIG. 3(b), a method performed to host an ACTIVEX control within a preexisting window, by creating a window of the class as registered via the method of FIG. 3(a), is shown. This method is thus performed each time a computer program wishes to have one of its windows host an ACTIVEX control. Thus, the method of FIG. 3(b) represents the code for implementing an ACTIVEX control container as has been registered via the method of FIG. 3(a). From step 304, control proceeds to step 306, in which step a program attempts to create a window of the class previously registered via the method of FIG. 3(a), via assertion of a command (i.e., call) to the WIN32 API. The AxHost component of the WIN32 API participates in this call, and examines the contents of a control parameter passed by the program.

In one embodiment, this control parameter is the "window name" parameter. This parameter refers to a specific ACTIVEX control that is desired to be hosted within a window (the relevant window is also passed within the call as a parameter—specifically, the window handle is passed). The ACTIVEX control may by referenced as a Component Object Model (COM) ProgID, a COM ClassID, a URL address, or HTML code, all of which are known and understood within the art.

In step 308, if the control parameter is a ProgID, or program identifier, control proceeds to step 310, in which step the ProgID (such as MSCal.Calendar.7) is converted to a ClassID, or class identifier (such as 8327C92B-1264-101C-8A2F-040224009002) that references an ACTIVEX control. Then, in step 312, an instance of the ACTIVEX control is created, within the window also passed within the call us a parameter. The method ends in step 314, returning a reference to the ACTIVEX control so that further control and handling of the control can be performed by passing the reference as a parameter in calls to other functionality within the interface (i.e., the WIN32 API). If in step 308 the control parameter was not a ProgID, control instead proceeds to step 316. In step 316, if the control parameter is a ClassID, or class identifier, control proceeds to step 312, where as has been described an instance of the desired ACTIVEX control as referenced by the ClassID, is created. The method the ends in step 314.

If in step 316 the control parameter was not a ClassID, control passes to step 318. In step 318, if the control parameter is a Universal Resource Locator (URL) address then control proceeds to step 320. In step 320, an Internet Explorer 4 control is created (i.e., a DocObject Viewer Control), as known within the art, and is instructed to display the document at the given URL address. The method then proceeds to step 312, to create a specific instance of this control, and the method ends in step 314. Finally, if in step 318 the control parameter was not a URL address, control passes to step 322. In step 322, it is assumed that the parameter contains raw HyperText Markup Language (HTML) code. Thus, control proceeds to step 320, in which an Internet Explorer 4 control is created and instructed to display the HTML code passed as the parameter. The method proceeds to step 312, creating a specific instance of the control, and the method ends in step 314.

Computerized methods for an exemplary embodiment of the invention have been shown and described. The methods have been described in particular relation to the MICROSOFT WINDOWS operating system, windows of the MICROSOFT WINDOWS operating system, the WIN32 API, and ACTIVEX controls. Those of ordinary skill within the art will appreciate that other operating systems, windows, interfaces, and controls are also amenable to the invention.

Conclusion

Hosting user interface controls in a window via an interface for controlling the window has been described. In particular the use of a component that is a part of the WIN32 API has been described that permits the hosting of ACTIVEX controls within a window. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computerized system comprising:
   an operating system having a WIN32 application programming interface (API) including a hosting mechanism that provides for hosting of at least one ACTIVEX-type control having support for the IUnknown interface within at least one window of the operating system; and
   at least one program operating in the operating system and utilizing the interface to host at least one ACTIVEX-type control having support for the IUnknown interface within said at least one window, said utilizing including intercepting a function call to provide for hosting of the least one ACTIVEX-type control.

2. A computer comprising:
a computer-readable medium bearing computer readable operating system instructions for executing an operating system of said computer; and
a computer-readable medium bearing computer readable instructions for executing at least one application program;
wherein said computer-readable operating system instructions include hosting mechanism instructions, said hosting mechanism instructions are provided in a WIN32 application programming interface (API), callable by said at least one application program, for
(1) controlling at least one window within the operating system, and
(2) hosting at least one ACTIVEX-type control having support for the IUnknown interface within said at least one window of the operating system, said hosting including intercepting a call to provide for hosting of the at least one ACTIVEX-type control.

3. The computer of claim 2, wherein the at least one window comprises at least one window of the MICROSOFT WINDOWS operating system at least as recent as the MICROSOFT WINDOWS 95 operating system.

4. A computer-readable medium having a computer program stored thereon for execution on a suitably equipped computer comprising an application programming interface (API) for both controlling windows of the MICROSOFT WINDOWS operating system at least as recent as the MICROSOFT WINDOWS 95 operating system and hosting controls having support for the IUnknown interface with the windows of the MICROSOFT WINDOWS operating system, wherein said hosting includes intercepting a call to provide for hosting of the controls.

5. An operating system for a computer comprising an application programming interface (API) for both controlling at least one window of the MICROSOFT WINDOWS operating system at least as recent as the MICROSOFT WINDOWS 95 operating system and hosting controls having support for the IUnknown interface within the at least one window of the MICROSOFT WINDOWS operating system, wherein said hosting includes intercepting a call to provide for hosting of the controls.

6. A computer-readable medium having a computer program stored thereon for execution on a suitably equipped computer comprising an application programming interface (API) for both controlling windows of the MICROSOFT WINDOWS operating system at least as recent as the MICROSOFT WINDOWS 95 operating system and hosting ACTIVEX-type controls with the windows of the MICROSOFT WINDOWS operating system, wherein said hosting includes intercepting a call to provide for hosting of the ACTIVEX-type controls.

7. An operating system for a computer comprising an application programming interface (API) for both controlling at least one window of the MICROSOFT WINDOWS operating system at least as recent as the MICROSOFT WINDOWS 95 operating system and hosting ACTIVEX-type controls within the at least one window of the MICROSOFT WINDOWS operating system, wherein said hosting includes intercepting a call to provide for hosting of the ACTIVEX-type controls having support for the IUnknown interface.

* * * * *